United States Patent [19]
Bold

[11] Patent Number: 5,477,957
[45] Date of Patent: Dec. 26, 1995

[54] PROCESS FOR CONTINUOUSLY FORMING A UNIFORM LAYER OF LOOSE MATERIAL AND INSTALLATION FOR CARRYING OUT THE PROCESS

[75] Inventor: Jörg Bold, Kaiserslautern, Germany

[73] Assignee: Babcock BSH Aktiengesellschaft Vormals Buttner-Schilde-Haas AG, Krefeld, Germany

[21] Appl. No.: 196,167

[22] PCT Filed: Aug. 17, 1992

[86] PCT No.: PCT/EP92/01870

§ 371 Date: Feb. 16, 1994

§ 102(e) Date: Feb. 16, 1994

[87] PCT Pub. No.: WO93/04829

PCT Pub. Date: Mar. 18, 1993

[30] Foreign Application Priority Data

Aug. 29, 1991 [DE] Germany .......................... 41 28 636.7

[51] Int. Cl.[6] .................................. B65G 37/00
[52] U.S. Cl. ........................................... 198/622
[58] Field of Search .................. 198/502.1, 622, 198/623, 562, 564, 566

[56] References Cited

U.S. PATENT DOCUMENTS

| 2,822,028 | 2/1956 | Himmelheber et al. . | |
| 4,304,326 | 12/1981 | Fowles | 198/623 |
| 4,324,495 | 4/1982 | Martinez | 198/622 X |

FOREIGN PATENT DOCUMENTS

| 0294616B1 | 7/1993 | European Pat. Off. . | |
| 0512940 | 11/1930 | Germany | 198/622 |
| 2552157 | 5/1979 | Germany . | |
| 3439493 | 5/1986 | Germany . | |
| 3719129 | 12/1988 | Germany . | |
| 1426900 | 9/1988 | U.S.S.R. | 198/502.1 |
| 2083432 | 3/1982 | United Kingdom | 198/622 |
| WO89/06592 | 7/1989 | WIPO . | |

*Primary Examiner*—James R. Bidwell
*Attorney, Agent, or Firm*—Herbert Dubno

[57] ABSTRACT

A process and apparatus for the continuous production of a uniform layer of loose material on a forming belt has a receiving belt onto which the loose product is deposited by a gravity chute in strips transverse to a travel direction of the receiving belt. A smoothing device above the receiving belt engages the strip layer over the entire length thereof on the receiving belt and smooths the material before it passes to a dispersing device directly or via said dispersion belt.

12 Claims, 3 Drawing Sheets

PROCESS FOR CONTINUOUSLY FORMING A UNIFORM LAYER OF LOOSE MATERIAL AND INSTALLATION FOR CARRYING OUT THE PROCESS

CROSS REFERENCE TO RELATED APPLICATION

This application is a national phase application of PCT/EP92/01870 filed 17 Aug. 1992 and based upon German national application P41 28 636.7 of 29 Aug. 1991 under the International Convention.

FIELD OF THE INVENTION

The invention relates to an apparatus and process for forming a uniform layer of loose material.

BACKGROUND OF THE INVENTION

In the production of building boards frequently a spreading process, i.e. a dry or quasi-dry manufacturing process, is used. A mixture of binders, reinforcement materials and fillers is spread on a moving forming belt and subsequently densified in a press. As is for instance known from DE-OS 34 39 493, the layer can be built up by several layers spread onto the forming conveyor belt.

In the DE-OS 37 19 129 a process for the continuous formation of a uniform layer of loose material as well as an installation for carrying out the process are described. The continuously incoming loose material is deposited in strips by means of a gravity chute oscillating across the receiving belt. The deposition period and the speed of the receiving belt are attuned to each other, so that one strip comes to lie next to the other, forming a gap-free coating of the receiving belt. In addition to this adjustment, the translatory speed of the gravity chute can be finely varied, in order to systematically even out the height variations of the deposited layer occurring over the width of the spread layer.

For this purpose the thickness of the spread layer is measured and the results are used for setting the speed profile of the oscillating gravity chute. In this way the naturally established mass profile can be counteracted.

In a further development a stripper roll designed as a spiked roller is arranged above the receiving belt, and driven in a direction of rotation selected so that it throws the projecting material in the travel direction of the receiving belt. This step is particularly important when quick-setting, wetted, gypsum-containing masses are supposed to be spread.

In this process height variations of the plate of 5 to 10% still occur. Such height variations occur especially in wider plates with a width of approximately 2.50 m. For the correspondingly larger widths, the height of the gravity chute is also increased as necessary. Thereby the stream of falling loose material reaches a considerable speed and kinetic energy, which result in uncontrollable movements of the spread material upon impact on the receiving belt. In this way a gap-free covering of the belt is not insured. A rather wavy layer which can even have holes is formed.

Under these conditions the spiked rollers are not in a position to level the irregularities, when they work in the travel direction. In practical applications it has been found that a uniformization is possible only in the conventional manner, when the spiked rollers work in the opposite direction and strip back the projecting material.

This procedure has considerable disadvantages when wet, gypsum-containing mixtures are spread. The reason is that behind the roller accumulations of material are formed which rotate, and in the core of which material can be caught for periods of minutes.

OBJECT OF THE INVENTION

It is the object of the invention to provide a process and apparatus for the continuous formation of a uniform layer of loose material which make possible a better uniformization of the dispersed layer and which are therefore also suited for larger spreading widths.

SUMMARY OF THE INVENTION

According to the invention the incoming loose material is transformed into at least one stream of intermediate product, each stream of intermediate product being deposited in strips on a receiving belt transversely with respect to its travel direction, subjected to the smoothing action of a combing device working in the travel direction of the belt and spread by means of a dispersion device onto a forming belt. Each stream of intermediate product is smoothed by the coming device over a combing surface extending in the travel direction of the receiving belt, whereby the effective length of the combing surface is at least seven times greater than the distance between two strips and the distance of the combing surface to the receiving belt can be set at a value which is slightly lower than the average height of the layer formed by the strips and which decreases slightly in the travel direction of the receiving belt.

The apparatus for carrying out the process comprises a belt for the incoming loose material, optionally with a distribution device, and feed belts, with at least one gravity chute, one receiving belt, one combing device and one dispersion device. The gravity chute and the combing device are arranged above the receiving belt in succession in the travel direction of the intermediate product stream and a forming belt is arranged beneath the dispersion device or devices.

The combing device has one or more movable carriers extending in the travel direction of the receiving belt equipped with combing tools, whereby the carriers are arranged so that they are height-adjustable and that their angle can be adjusted in the travel direction of the receiving belt.

The respective stream of intermediate product is smoothed with the combing device over a combing surface extending in its travel direction. Due to the surface combing it is possible to obtain a substantially improved uniformization of the loose material deposited in strips than is possible with a spiked roller.

An effective length of the combing surface of at least 7 times the distance between two strips should be maintained. The effective length is smaller than the length of the combing surface by the difference between the speed of the combing tools in the travel direction of the receiving belt and the speed of the receiving belt, in relation to the speed of the combing tools. In order not to increase too much the length of the combing surface, the speed of the combing tools should be a multiple of the receiving belt speed, preferably at least 8 times.

A further improvement of the layer uniformity downstream between the combing device is obtained when the distance of the combing surface and the receiving belt is set to a value which lies slightly below the average height of the layer formed by the strips.

A slight decrease of the distance between the combing surface and the receiving belt in the travel direction of the latter contributes additionally to the uniformization of the layer.

A particularly good uniformization is obtained when the distance between the combing surface and the receiving belt decreases in the travel direction of the receiving belt to 70 to 98% of the average layer height and/or by a value between 0 and 3%.

The uniformization is so good that even gaps which occur in large dispersion widths can be evened out. Also periodically forming rises and depressions in the travel direction, which occur due to overlapping strips when the deposition is not precisely adjusted, can be evened out.

Downstream of the combing device a layer with uniform thickness over the entire width is obtained.

Advantageously, the stream of intermediate product is deposited on a dispersion belt after smoothing and prior to dispersion. The deposition on an additional dispersion belt, for instance by means of a discharge roller, makes possible a simple adjustment to changes in the speed of the forming belt, by changing the speed of the dispersion belt, without having to change the speed of the receiving belt. Besides through variations of the dispersion belt speed it is possible to set the optimal height of the smoothed layer before it reaches the dispersion machine.

Measuring the mass profile on the dispersion belt is simpler to perform than a measurement taken in or directly downstream of the dispersion device, whose surrounding area is always covered by a thick dust. It also avoids the allowance for thickness defects produced during pressing, which is considered in a measurement of the finished plate.

The mass profile of the material, which contains water, can be measured by measuring the water mass. This is particularly well suited for prewetted loose materials, in which the wetness is basically of an even distribution and thereby proportional to the total mass.

The combing tools are for instance cams, pins, paddles or cleats.

At a length of the receiving belt equal to 8 to 15 times the lower opening of the gravity chute and with carriers extending over the entire free length of the receiving belt, a speed of the carriers or the combing tools of about 8 times higher is sufficient for carrying out the process.

The combing device can have a band with combing tools passing over two rollers of adjustable individual heights. The combing device can be produced with little expense.

A drive for moving the carriers, i.e. the plates or frames, are at a certain distance from the layer to be smoothed and thereby less exposed to contamination by whirled-up loose material.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
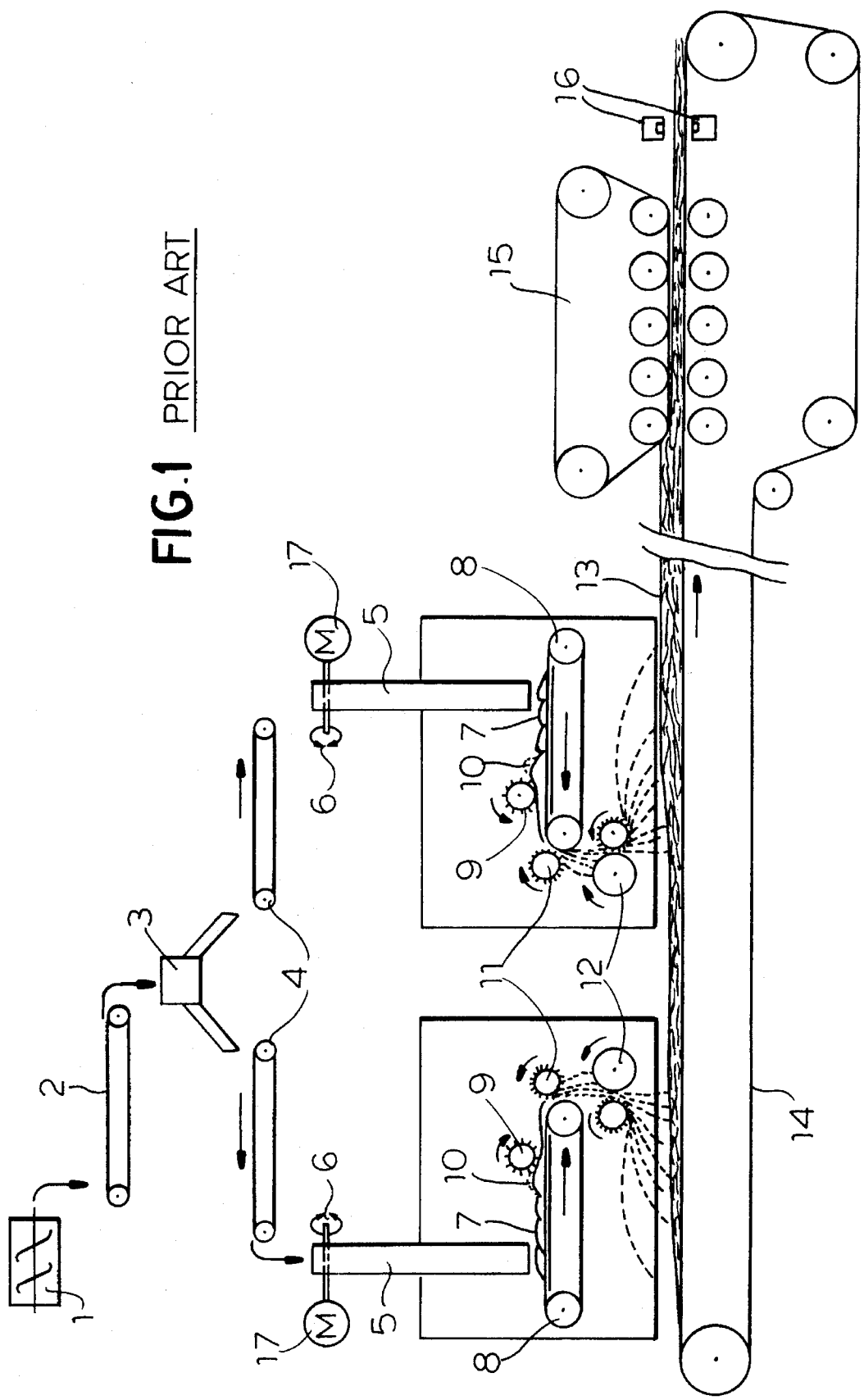
FIG. 1 is a diagram illustrating an apparatus for producing a layer of loose material in accordance with the prior art.

The device shown in FIG. 1 has a mixer 1 whose outlet leads to a belt 2. The belt 2 leads to a distribution device 3. Starting from the distribution device 3 two feeding belts 4 lead to two gravity chutes 5. Each gravity chute is swingable about an axis 6 arranged in its upper area.

Further FIG. 1 shows several strips 7 of loose material deposited in succession on the receiving belt 8, arranged underneath the opening of the respective gravity chute 5. Besides the device also has a stripper roll 9 arranged above the receiving belt 8, for smoothing the layer 10, a discharge roller 11 and a dispersion device, basically consisting of a dispersion head 12.

The dispersion layer 13 forms on a forming belt 14 running underneath the two dispersion devices arranged one after the other. The forming belt 14 runs to a press 15 and a measuring device 16 arranged downstream thereof.

Figure 2:
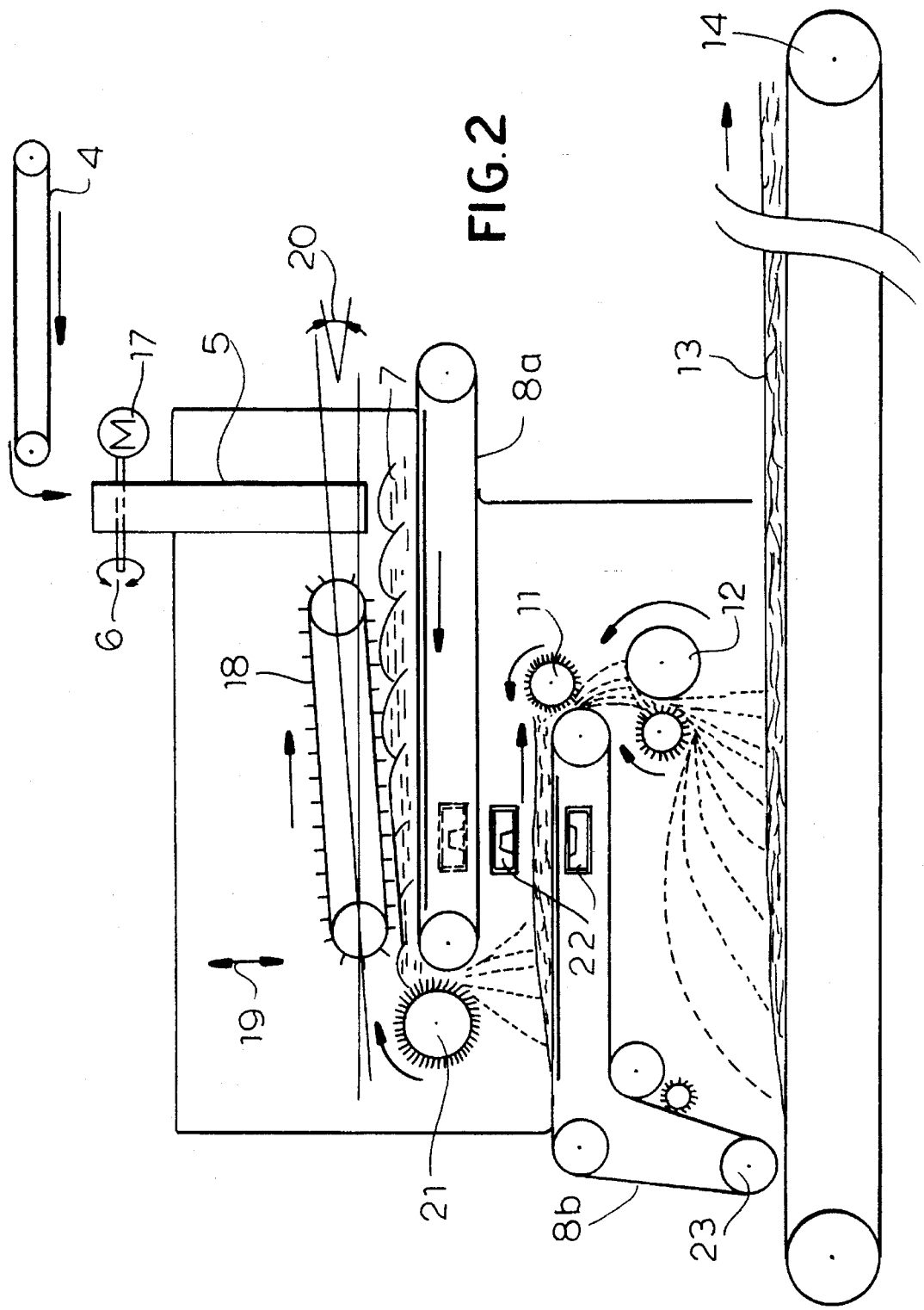
FIG. 2 is a view similar to FIG. 1 showing an apparatus for carrying out the process of the invention in accordance with one example.

Besides in FIG. 2 also motors 17 for the swinging motion of the gravity chutes 5 are shown.

In operation the loose material mixed in mixer 1 is conveyed on belt 2 to the distribution device 3, which supplies two feeding belts 4 to the gravity chute 5. The gravity chutes 5 swing about axis 6 to, whereby they deposit strips 7 of the loose material onto the receiving belt 8. The stripping roller 9 combs the surface of the layer against the conveying direction. From DE-OS 37 19 129 also a spiked roller combing in the conveying direction, i.e. the travel direction of the receiving belt 8, is known. The discharge brush 11 throws the material to be dispersed onto the actual dispersion head 12. The final dispersed layer is created on the forming belt 14 through the dispersion heads arranged in succession. Downstream of press 15 the thickness or a thickness and density profile is measured by a measuring device 16. The results of this measurement are processed for the control of drives 17 of the gravity chutes 5.

EXAMPLE 1

In the first example (FIG. 2) a device according to the invention distinguishes itself over the prior art in the following manner:

The device has a substantially longer receiving belt 8a. The length of the receiving belt 8a starting from the gravity chute 5 is approximately 8 times greater than the bottom opening of the gravity chute 5, i.e. eight strips 7 can be deposited.

It has a combing device with a carrier, here a band with cams 18, guided around two rollers. The combing device extends from the gravity chute 5 over the entire length of the receiving belt 8a.

The band 18 extends of course also over the entire width of the receiving belt 8a.

The rollers supporting the band are each mounted to be height-adjustable on a frame not shown in the drawing. As a result the combing surface resting on the surface of the layer is height-adjustable in its entirety, as indicated by arrow 19, and, as indicated by an angle symbol 20, its angle can also be adjusted.

The combing surface is thereby arranged so that its distance to the receiving belt 8a decreases in the travel direction of the receiving belt 8a at an angle between 0° and 3°, here 2°.

At the end of the receiving belt 8a, an additional discharge roller 21 is provided. The discharge roller is larger than discharge roller 11 upstream of the dispersion device (FIG. 1).

Also additionally underneath the discharge roller 21 a dispersion belt 8b is arranged. At its end there is the discharge roller 11 and the dispersion device with the dispersion head 12.

A two-part measuring device 22 is arranged at the dispersion belt 8b, underneath and above the smoothed layer. The second upper part of the measuring device 22 can also be arranged above an empty belt portion of the receiving belt 8a which runs above the dispersion belt 8b, in order to avoid contamination (in FIG. 2 shown in broken lines).

For cleaning purposes the dispersion belt 8b is guided over a roller 23, closely above the forming belt 14, outside the dispersed layer. This is particularly advantageous in the case of wet, gypsum containing mixtures.

Like in the state of the art, the receiving belt 8a and the forming belt 14 have the same width. The dispersion belt 8b has also the same width.

In operation the stream of intermediate product supplied through the fall chute 5 is deposited in strips on the receiving belt 8a. The formed uneven layer in this case of eight adjacent strips 7 is combed over the entire accessible area of the receiving belt by the combing device which acts on the whole surface of the stream of semi-finished product in the direction in which it is conveyed.

Thereby the travel speed of the cams 18 is a multiple, here 10 times, of the speed of the receiving belt 8a. The higher the speed of cams 18, i.e. of the comb tools, the bigger the effective length of the combing.

The effective length of the combing surface is here approximately 7 times the distance between two strips 7 (more accurately 7.2 times). The distance of cams 18 to the receiving belt 8a is set here at 98% of the average height of the layer and decreases in the travel direction of the receiving belt 8a by 2%.

Due to the slightly decreasing distance of the combing surface to the receiving belt 8a, the deposited layer is lightly pressed together during combing. A smoothed layer of even height is created. Due to a relatively low speed of the receiving belt 8a, a layer with a bigger height than the height upstream of the dispersion device is created and thereby higher than the layer produced by the state of the art downstream of stripping roller 9. A low receiving belt speed also makes possible a favorable, i.e. high speed ratio between the combing device and the receiving belt.

At the end of receiving belt 8a the loose material is thrown by means of discharge roller 21, whose size corresponds to the height of the layer, onto the dispersion belt 8b, which has a higher speed than the receiving belt 8a. On the dispersion belt 8b a considerably more even layer is created than the one formed solely by deposition downstream of the gravity chute 5.

On the dispersion belt the mass profile is measured across the dispersion width by means of measuring device 22.

The measuring device 22 can determine the mass with radioactive isotopes (gamma rays absorption) the measuring device 22 can alternatively be a device for mechanically weighing this mass. In the case of wet mixes, a measuring device 22 for measuring the mass of water, for instance by microwave steaming is used. By measuring the mass profile of each individual stream of intermediate product on the respective dispersion belt 8b and by feedback to the drive 17 of the gravity chute 5 the movement of the single gravity chute 5 can be individually adjusted via small variations in its translatory speed.

Instead of a band with cams 18 it is also possible to use an arrangement of chains with cams or pins, guided along each other. Instead of the pin-shaped combing tools, it is also possible to use wider tools, such as paddles and cleats. In the case of paddles, these can also be arranged alternately inclined, this way achieving in addition a limited lateral uniformization.

Besides, the band or the rollers can be provided with a heating device in order to prevent condensation. In operation the band with the combing tools is heated to a temperature above the dewpoint existing in the surroundings of the receiving belt 8a.

EXAMPLE 2

Figure 3:
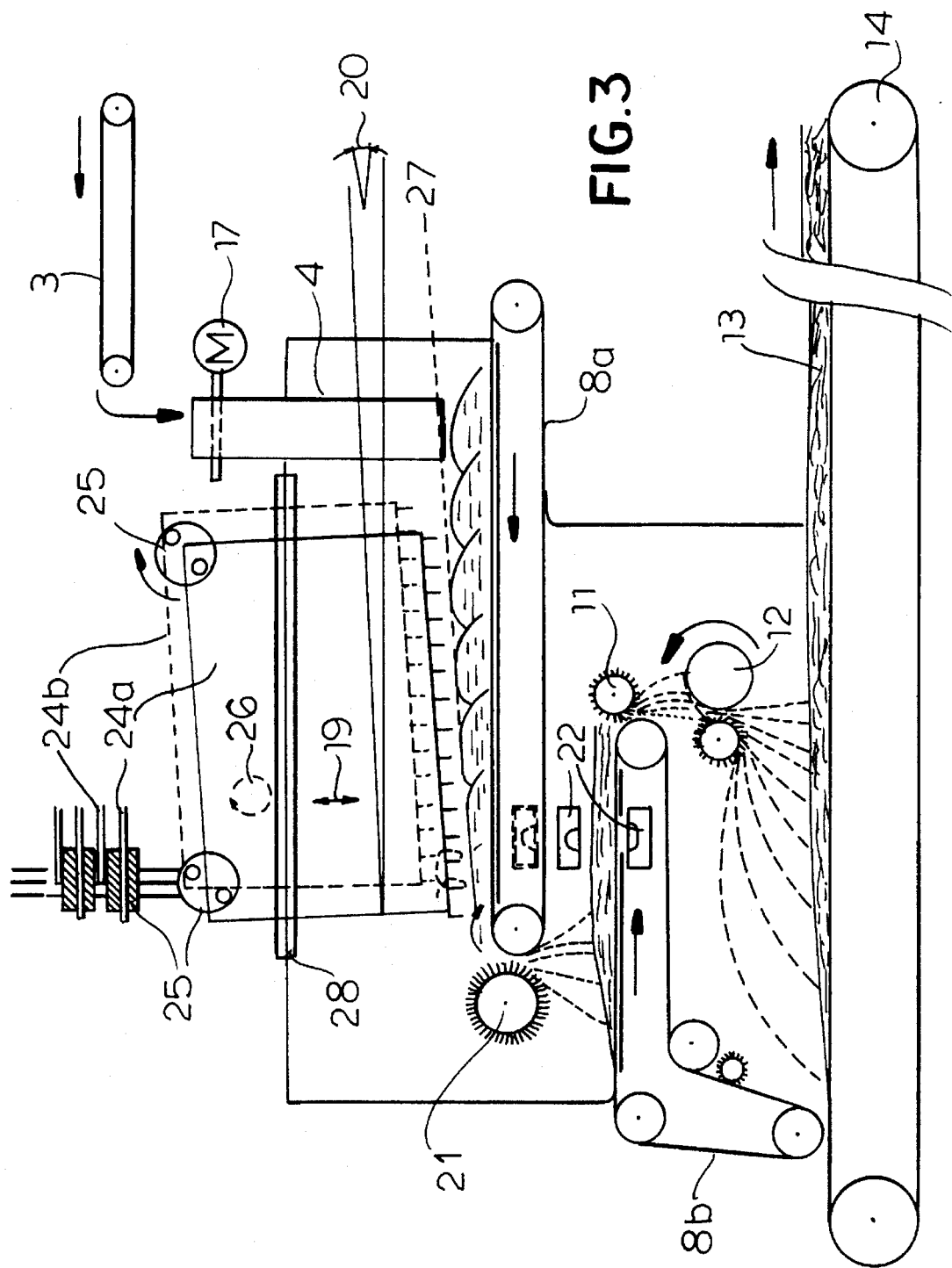
FIG. 3 is a view similar to FIG. 1 of an apparatus for carrying out the method of the invention in accordance with another example.

The installation of Example 3 (FIG. 3) differs from the one of Example 1 in that it has another embodiment of the combing device.

The combing device of Example 3 has several vertical plates 24a, 24b arranged in the travel direction of the receiving belt 8a, each eccentrically suspended in the front and the back on a crankshaft 25, whereby the plates 24a, 24b are located in slots of the crankshafts 25.

The crankshafts 25 are arranged parallel to one another and are synchronized, i.e. have for instance a common drive.

On their edges oriented towards the receiving belt 8a, the plates 24a, 24b have teeth or other combing tools. In operation these combing tools perform circular motions indicated by the circle symbol 26 and thereby act as a plurality of interengaging spike rollers.

The crankshafts 25 are individually height-adjustable, so that the total height (arrow 19), as well as the angle (arrow 20) of the combing surface represented by the effective line 27 can be adjusted. The above-mentioned circular motions are performed along the effective line 27.

The plates 24a, 24b are guided in guides 28 arranged approximately at their half height and having slots running parallelly to the travel direction of receiving belt 8a. These guides 28 prevent an uncontrolled lateral swinging.

In addition a device for controlling the lateral oscillations of the crankshafts 25 and/or the guides 28 can be provided. In this way an improved coverage of the layer can be achieved.

It is also possible to use frames instead of plates 24a, 24b.

The propulsion by means of crankshafts is only an example of several possibilities to achieve alternating motions of the combing tools. Especially the circular motion, circle symbol 26, can be replaced by elliptical motions or by linear motions along the effective line 27. It is also within the framework of the invention to arrange the combing tools transversely to the conveying direction so that they interengage and comb alternately.

The advantage of this embodiment is that problems such as contamination by dust and condensation in the case of wet and warm loose material can be controlled. All surfaces with a horizontal component are avoided and the drive is kept away from the dust zone.

The plates 24a, 24b or frames can be additionally provided with heating devices to prevent condensation. By heating the plates 24a, 24b it is not necessary to heat any rotating parts.

The way the invention works was calculated in a computer simulation. The calculation starts with the simplified assumption that the layer deposited through the gravity chute 4 has a base height of 3 cm and that on top of that lies a sinusoidal wave with an amplitude of 6 cm, so that an average height of 6 cm results.

The effective length (Table 1, line 1) is indicated to be a multiple of the distance between strips 7. The distance between strips 7 corresponds in the case of adjacently disposed strips 7 to the width of the deposited strips 7. The results of the simulation are given in Table 1.

In the first block of the table the height of the lowest point of the combing band above the receiving belt is varied. It can be seen that the best effect is obtained closely below the average height of the deposited layer. The effect stabilizes at good values for the lower heights. When the height is greater than the average layer height, the efficiency decreases dramatically and here and there holes appear in the layer deposited on dispersion belt 8b.

The second block varies the effective length. It can be seen that the efficiency decreases below ten times the distance between strips 7.

Therefore a particularly good uniformization is achieved when the effective length is 10 to 15 times the distance between the strips 7.

However also at an effective length of 7 to 9 times the distance between strips 7 considerably lower height variations are achieved than with the state of the art.

The third block of the table varies the setting angle of the combing surface; the angle is here indicated in % of gradient. It has been found that negative angles are of little help and that above 2.5% the efficiency decreases quickly.

In further calculations it has been found that the measure by which the deposited layer varies has only a slight influence on the result, as long as the other parameters are maintained as established above.

The strips 7 must no longer be precisely laid out one next to the other during their deposition through the gravity chute 4. For instance small overlappings of strips 7 do not contribute to height variations or contribute very little to height variations.

Example: The gravity chute oscillates with a medium cycle time of 6 s. The average width of the deposited strips is 30 cm, the average height equals 6 cm, the variation is ±3 cm. The length of the receiving belt after the point where it is impacted by the loose material is 3.5 m, the length of the combing device 3.3 m. The speed of the receiving belt equals 3.0 m/min, the speed of the combing device 30 m/min. The height of the lowermost attack point of the effective line of the cams lies at 5 cm above the receiving belt. With this selection also the differences in the transverse distribution up to 15% are covered. The setting angle is 1%. This way an excellent uniformization of the layer deposited on the dispersion belt 8b is achieved and it is also insured that loose material does not dwell longer on the receiving belt 8a than it is suitable to the belt speed.

The speed of the dispersion belt 8b is 6 m/min and correspondingly the height of the layer on the belt is 30 mm. At a bulk weight of approximately 250 kg/m$^3$ a surface load of 7.5 kg/m$^2$ results.

If a surface weight of the dispersion belt 8b of 750 g/m$^2$ and a variation range of ±5% are assumed, the measuring error induced by the belt in a mass measurement is ±0.5% at the dispersion belt 8b.

TABLE 1

COMPUTER SIMULATION OF A COMBING DEVICE

| Column | | 1 | 2 | 3 | 4 | 5 | 6 | 7 | 8 | 9 | 10 |
|---|---|---|---|---|---|---|---|---|---|---|---|
| Effective length | | 10 | | | | | | | | | |
| Amplitude variation | cm | 6.0 | | | | | | | | | |
| Base height | cm | 3.0 | | | | | | | | | |
| Average height strip | cm | 6.0 | | | | | | | | | |
| Maximum height strip | cm | 9.0 | | | | | | | | | |
| Minimum height strip | cm | 3.0 | | | | | | | | | |
| Standard variation | % | 35.5 | | | | | | | | | |
| End height comb | cm | 5.0 | 5.5 | 5.8 | 5.85 | 5.9 | 5.95 | 6.0 | 6.2 | 6.5 | 7.0 |
| Gradient comb | % | 2.0 | | | | | | | | | |
| Average height result | cm | 6.0 | 6.0 | 6.0 | 6.0 | 6.0 | 6.0 | 6.0 | 6.0 | 6.0 | 6.0 |
| Maximum height result | cm | 6.3 | 6.3 | 6.24 | 6.08 | 6.08 | 6.1 | 6.2 | 6.4 | 6.6 | 7.1 |
| Minimum height result | cm | 5.9 | 5.9 | 5.90 | 5.92 | 5.92 | 5.5 | 5.1 | 4.1 | 3.6 | 3.0 |
| Standard variation | % | 1.3 | 1.3 | 1.1 | 0.9 | 0.85 | 2.5 | 3.9 | 10.6 | 16.4 | 24.9 |
| Maximal variation | % | 6.2 | 6.2 | 5.7 | 2.7 | 2.7 | 9.8 | 17.0 | 36.6 | 51.1 | 68.7 |

| Column | | 11 | 12 | 13 | 14 | 15 | 16 | 17 |
|---|---|---|---|---|---|---|---|---|
| Effective length | | 20 | 15 | 10 | 8 | 7 | 5 | 3 |
| Amplitude variation | cm | 6.0 | | | | | | |
| Base height | cm | 3.0 | | | | | | |
| Average height strip | cm | 6.0 | | | | | | |
| Maximum height strip | cm | 9.0 | | | | | | |
| Minimum height strip | cm | 3.0 | | | | | | |
| Standard variation | % | 3.5 | | | | | | |
| End height comb | cm | 5.9 | | | | | | |
| Gradient comb | % | 2.0 | | | | | | |
| Average height result | cm | 6.0 | 6.0 | 6.0 | 6.0 | 6.0 | 6.0 | 6.0 |
| Maximum height result | cm | 6.08 | 6.08 | 6.08 | 6.1 | 6.2 | 6.3 | 6.4 |
| Minimum height result | cm | 5.94 | 5.93 | 5.92 | 5.7 | 5.5 | 4.7 | 4.1 |
| Standard variation | % | 0.66 | 0.83 | 0.85 | 1.59 | 2.57 | 5.82 | 8.9 |
| Maximal variation | % | 2.3 | 2.5 | 2.7 | 7.2 | 10.9 | 26.3 | 38.7 |

| Column | | 18 | 19 | 20 | 21 | 22 | 23 | 24 | 25 | 26 |
|---|---|---|---|---|---|---|---|---|---|---|
| Effective length | | 10 | | | | | | | | |
| Amplitude variation | cm | 6.0 | | | | | | | | |
| Base height | cm | 3.0 | | | | | | | | |
| Average height strip | cm | 6.0 | | | | | | | | |
| Maximum height strip | cm | 9.0 | | | | | | | | |
| Minimum height strip | cm | 3.0 | | | | | | | | |
| Standard variation | % | 35.5 | | | | | | | | |
| End height comb | cm | 5.9 | | | | | | | | |
| Gradient comb | % | −1.0 | −0.5 | 0.0 | 0.5 | 1.0 | 1.5 | 2.0 | 2.5 | 3.0 |
| Average height result | cm | 6.0 | 6.0 | 6.0 | 6.0 | 6.0 | 6.0 | 6.0 | 6.0 | 6.0 |

TABLE 1-continued

COMPUTER SIMULATION OF A COMBING DEVICE

| | | | | | | | | | | |
|---|---|---|---|---|---|---|---|---|---|---|
| Maximum height result | cm | 7.5 | 7.2 | 6.8 | 6.1 | 6.1 | 6.2 | 6.1 | 6.1 | 6.4 |
| Minimum height result | cm | 5.8 | 5.8 | 5.9 | 6.0 | 6.0 | 5.9 | 5.9 | 5.8 | 5.4 |
| Standard variation | % | 7.65 | 5.8 | 4.55 | 0.35 | 0.65 | 0.9 | 0.85 | 1.55 | 3.2 |
| Minimum variation | % | 29.4 | 22.8 | 15.4 | 1.3 | 2.3 | | | | |
| Maximal variation | % | | | | | | 2.8 | 2.7 | 5.9 | 16.4 |

I claim:

1. A process for the continuous production of a uniform layer of a loose material, comprising the steps of:
    (a) transforming an incoming loose material into at least one stream of an intermediate product;
    (b) depositing said intermediate product in a layer of strips on a receiving belt transversely with respect to a travel direction of said receiving belt;
    (c) subjecting said layer of strips of said intermediate product on said receiving belt to smoothing action of a combing device working in said travel direction and over an effective length of a combing surface which is at least 7 times greater than a distance between two successive strips;
    (d) setting a distance of said combing surface from said receiving belt at a value which is slightly less than an average height of said layer of strips and which decreases slightly in said travel direction; and
    (e) dispersing said material from said receiving belt following discharge from an end thereof onto a forming belt to form said uniform layer of said loose material thereon.

2. The process defined in claim 1 wherein the distance of the combing surface from said receiving belt is set at 70 to 98% of said average height of said layer of strips.

3. The process defined in claim 1 wherein the distance of the combing surface from said receiving belt decreases by a value between zero and 3% in said travel direction of the receiving belt.

4. The process defined in claim 1 wherein said stream of said intermediate product is deposited from said receiving belt on a dispersion belt before being dispersed onto said forming belt.

5. The process defined in claim 4, further comprising the step of measuring a mass profile on said dispersion belt and controlling a deposition speed of said strips in response to the measurement.

6. The process defined in claim 5 wherein said mass profile is measured by measuring water mass.

7. An apparatus for the continuous production of a uniform layer of a loose material by the steps of:
    (a) transforming an incoming loose material into at least one stream of an intermediate product;
    (b) depositing said intermediate product in a layer of strips on a receiving belt transversely with respect to a travel direction of said receiving belt;
    (c) subjecting said layer of strips of said intermediate product on said receiving belt to smoothing action of a combing device working in said travel direction and over an effective length of a combing surface which is at least 7 times greater than a distance between two successive strips;
    (d) setting a distance of said combing surface from said receiving belt at a value which is slightly less than an average height of said layer of strips and which decreases slightly in said travel direction; and
    (e) dispersing said material from said receiving belt following discharge from an end thereof onto a forming belt to form said uniform layer of said loose material thereon, said apparatus comprising:

a feed belt for supplying said loose material;

another belt forming said receiving belt and located below said feed belt;

at least one gravity chute above said receiving belt and receiving said loose material from said feed belt and depositing said loose material on said receiving belt;

means above said receiving belt forming said combing device, said combing device having at least one movable carrier extending in said travel direction and equipped with combing tools, said carriers being height adjustable and having an adjustable angle in the travel direction of the receiving belt;

a dispersion device receiving said material from said receiving belt; and a further belt below said dispersion device and constituted as said forming belt.

8. The apparatus defined in claim 7 wherein said receiving belt has a length from said gravity chute to a discharge end thereof between 8 and 15 times a lower opening of the gravity chute and said carriers extend over an entire free length of the receiving belt.

9. The apparatus defined in claim 7 wherein said combing device has a band with combing tools passing over two rollers which are individually height adjustable.

10. The apparatus defined in claim 7 wherein said combing device has a plurality of plates or frames arranged vertically in said travel direction and eccentrically suspended on two individually height-adjustable crank shafts.

11. The apparatus defined in claim 7, further comprising a dispersion belt upstream of said dispersion device and following said receiving belt.

12. The apparatus defined in claim 7, further comprising a measuring device on said dispersion belt for measuring a mass profile thereon.

* * * * *